Figure 1A:
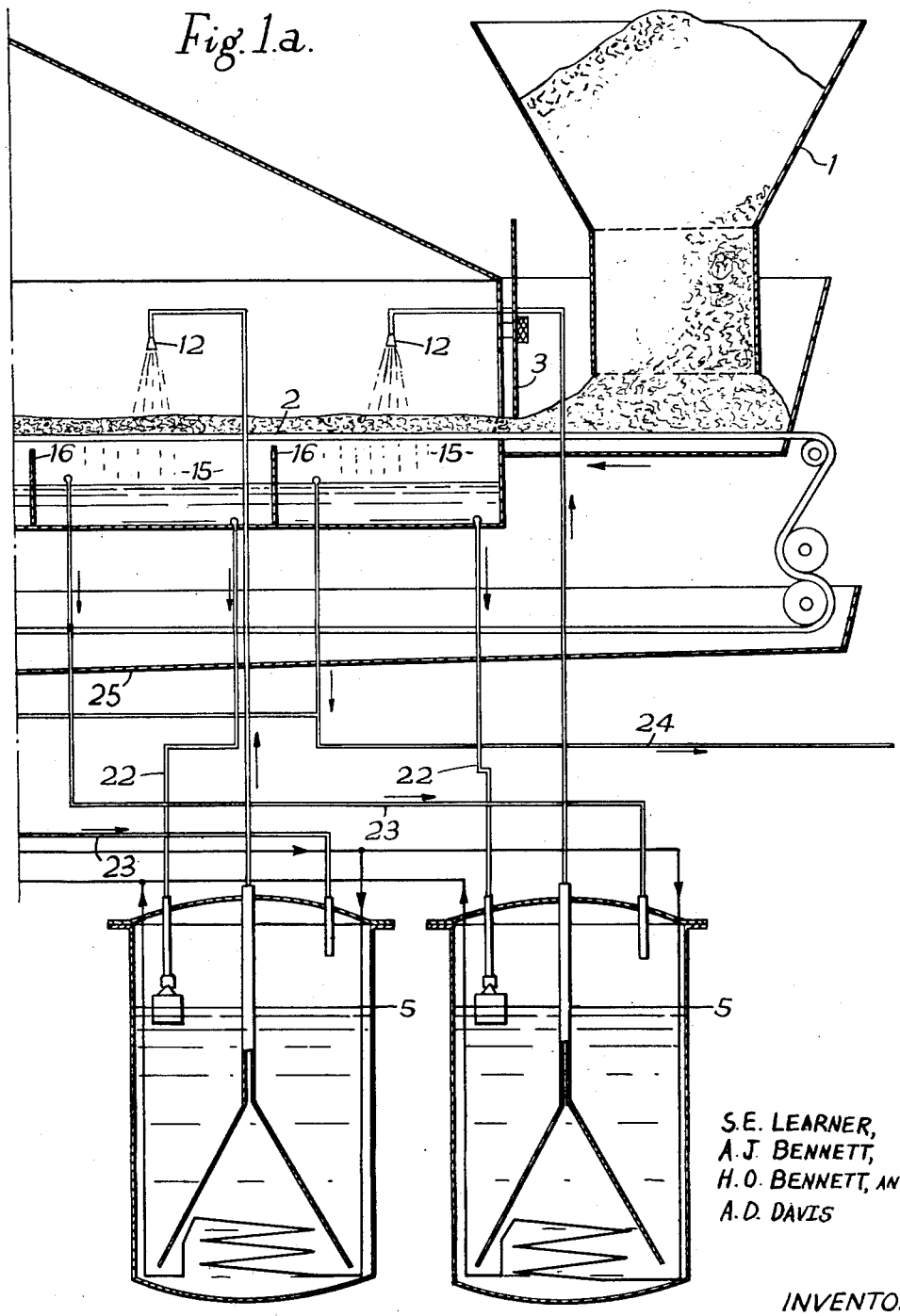

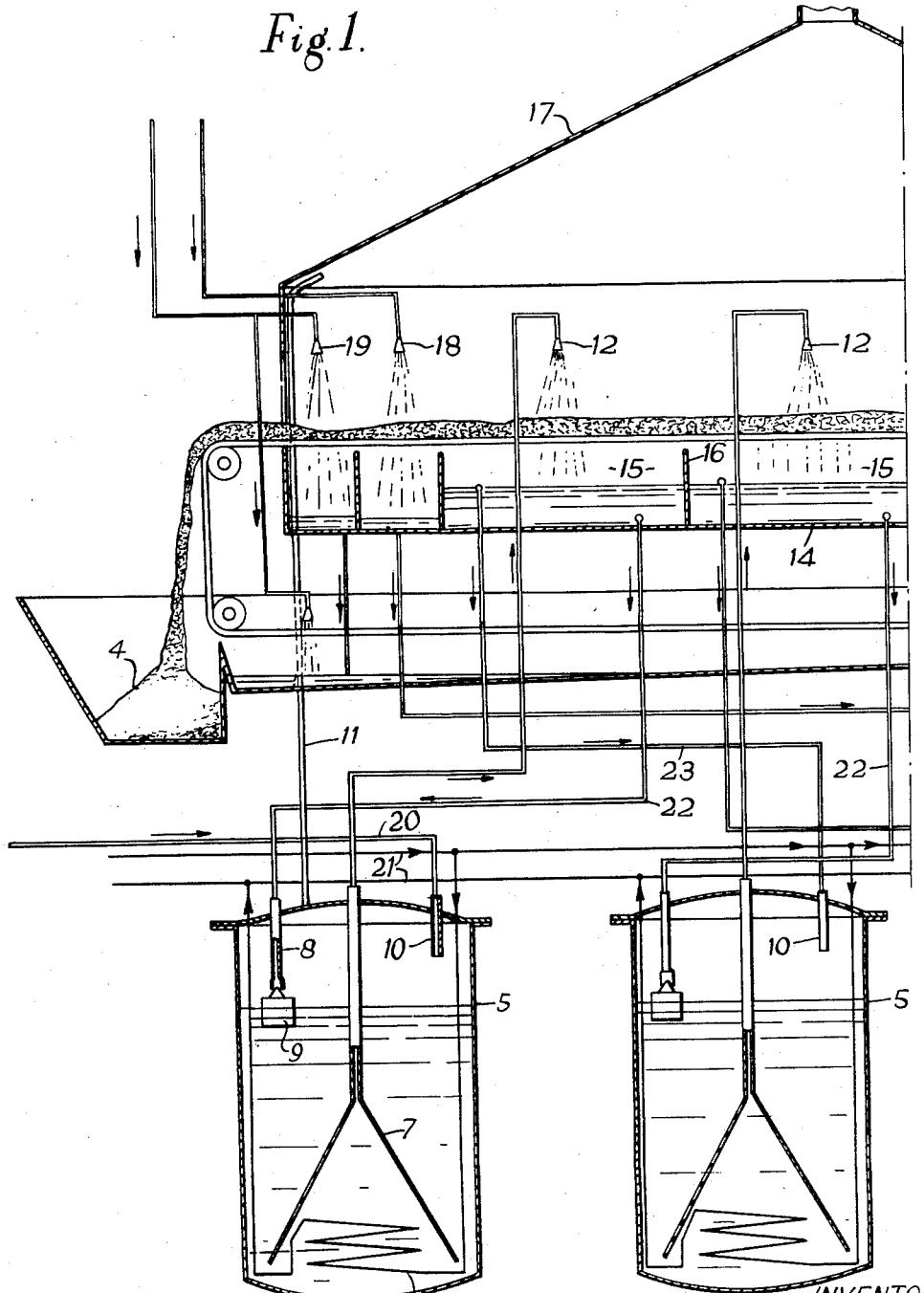

S.E. LEARNER,
A.J. BENNETT,
H.O. BENNETT, AND
A.D. DAVIS
INVENTORS

United States Patent Office 3,113,027
Patented Dec. 3, 1963

3,113,027
METHOD FOR THE CONTINUOUS BOILING OF WORT AND EXTRACTION OF HOPS
Sydney Edward Learner, Coulsdon, Anthony John Bennett, Redhill, Harry Ormond Bennett, Crawley, and Arthur Desmond Davis, Nutfield, England, assignors to Brewing Patents Limited, London, England
Filed June 1, 1960, Ser. No. 33,157
Claims priority, application Great Britain June 12, 1959
8 Claims. (Cl. 99—52)

The present invention relates to a method of hopping brewers' wort and to apparatus for the hopping of wort on a continuous basis. In conventional practice the hopping of wort is effected by boiling hops in wort to extract the bitter substances in hops, and these substances are, it is believed, subsequently isomerised in the boiling wort.

When hopped wort is boiled it is found that a solid deposit is formed resulting from the degradation of proteinaceous material and this is commonly referred to as "hot-break." It would appear that this deposit carries down with it a proportion of the bittering substances, and thus it is believed that in conventional brewing practice far more hops are used than is necessary for producing the desired amount of bitter flavouring in the final product. Since hops are an expensive commodity, it is an object of the present invention to provide an improved method and apparatus for hopping wort which will lead to economy in the use of hops. It is a further object of the present invention to provide an apparatus for hopping wort operating on a continuous basis.

Basically the method of the invention comprises filtering off the solids from wort and extracting the bittering substances from the hops by percolating a moving bed of hops with boiling wort, which is distributed over the top of the bed of hops at one or more points. The advantage of proceeding in this way is that by using the bed of hops as a filter body for the wort, the solid deposits formed in the wort as a result of boiling are filtered off on the top layer of the bed of hops, so that they do not form complexes with the bittering substances in the hops to any very substantial extent, and, in consequence, the wort is hopped to the desired degree with considerable economy in the use of hops.

Preferably the wort is pumped counter-current to the moving bed of hops and is percolated through the bed of hops two or more times at different positions along the bed so that the "hot-break" is filtered off in a part of the bed from which the bittering substances have already been largely or substantially completely extracted.

The preferred method of distributing the wort to effect the percolation treatment is by using an inverted funnel in the wort boiler. Heated liquid is forced upwardly through the tubular stem of the funnel by means of a "steam lift" in the manner employed in the well-known coffee percolator.

The apparatus is preferably comprised of a series of wort boiling vessels, a movable perforated hop-bed support, which is preferably an endless wire mesh belt, each of the boiling vessels being provided with a means for pumping the wort to a percolating head arranged over the hop-bed support, and a partitioned collecting tank arranged under the hop-bed support, each of the compartments of the collecting tank being provided with an overflow line leading to a boiling vessel and arranged so that the wort is progressed along the series of vessels. The progress of the wort is preferably counter-current to the movement of the bed of hops. In that way the bittering of the wort may be arranged to take place whilst the wort is being transferred between the last vessels of the series and the filtration of the hot-break arranged to take place at the beginning, so that the proteinaceous "hot-break" sludge is filtered off from the wort before the extraction of the bittering substances is commenced.

By suitable arrangement of the thickness of the bed of hops and its rate of travel in relation to the throughput rate of the wort, the extraction of the bittering substances from the hops is completed before the end of the path of the hop-bed is reached. Preferably the extraction is completed when the hops have reached the middle of their path, so that they are available purely for filtration in the latter part of the path.

One form of apparatus made in accordance with the present invention is shown diagrammatically in the accompanying drawings in which FIGS. 1 and 1a show the left-hand and right-hand halves of the apparatus, respectively.

Hops are fed from a hopper 1 onto a continuously moving wire belt 2 and the depth of the bed of hops is controlled by an adjustable gate 3. The speed of the belt 2 is very small. For example it may be set to progress hops from the gate 3 to a spent hop container 4 in about 1½ hours.

The wort is passed through a series of wort boilers 5. Each wort boiler 5 is provided with a steam heating coil 6, an inverted funnel 7, a wort return line connection 8 controlled by a float valve 9, a wort inlet line connection 10 and an air condenser line connection 11 (only one shown). It should be emphasized that the heating coil 6 and funnel 7 are a preferred device for heating and pumping the wort, but other devices could be substituted for this purpose.

Each inverted funnel 7 is connected to a percolator head 12 arranged over the belt 2. A collecting tank 14 is arranged under the bed of hops carried on the upper run of the belt 2 and this is divided into separate compartments 15 by partitions 16, which are arranged so that there is a compartment 15 positioned to receive the greater part of the wort distributed from the associated percolating head 12.

A condenser hood 17 is arranged over the tank 14 and hot water and cold water sparging heads 18 and 19 are arranged over the outlet end of the belt 2.

The operation of the apparatus is very simple. Wort is supplied through a line 20 to the first wort boiler 5 in the series. The wort is supplied in a continuous stream and for this purpose a continuously operating mash apparatus of the kind described in our co-pending patent application No. 816,321, now Patent No. 2,961,316, is preferably used in conjunction with the apparatus of the present invention.

The contents of the boilers 5 are boiled by the supply of steam to the coils 6 through steam lines 21. The wort entering the first vessel 5 is continuously pumped up from the funnel 7 to the associated percolator head 12 and is returned to the same boiler 5 through a line 22 leading from the bottom of the associated tank compartment 15 to the return line connection 8. The wort will be returned until the float valve 9 closes the connection. After this the first compartment 15 will fill up and then further wort will overflow through a line 23 and be advanced to the second boiler 5. The wort is progressed through the apparatus in this way and is finally led off from the overflow of the last tank compartment 15 through a line 24 to a receiver (not shown) for the hopped wort.

The extraction of the bittering substances may be substantially completed by the time the hops have been carried over the last two tank compartments in the series, so that the hops are substantially spent before they reach the first two tanks. Similarly the hot-break may be substantially completely filtered off before wort comes into contact with hops which have not been extracted. In this way great economy in the utilisation of hops may be achieved. It is estimated that only about 40% of the bittering substanecs are utilized in conventional brewing processes, whereas by the use of the present apparatus about double that rate of hop utilisation may be achieved.

Hot water sparging is applied by means of the head 18 to recover wort held in the bed of spent hops and the sparge liquor is added to the hopped wort carried off through the line 24. Cold water sparging is applied by the head 19 merely for cooling purposes and the cold water sparge liquor is carried into a drainage tray 25 arranged under the return run of the belt 2.

The zone above wort level in the boilers 5 has to be maintained at substantially atmospheric pressure to permit wort to drain into the boilers from the tank 14. It is for this reason that the air condenser connections 11 are provided. However, these may be eliminated if the lines 23 are of sufficiently large diameter.

We claim:

1. A method of hopping wort comprising percolating a moving bed of hops with hot wort so as to extract bittering substances from the hops and filter off solid material from the wort.

2. A method according to claim 1, wherein the hot wort is percolated through the hops at least two times, a stream of wort being moved in counter-current direction to the bed of hops and applied to the bed of hops at at least two different positions.

3. A method according to claim 2, wherein the first application of the hot wort to the bed of hops is a filtering operation effected at a position at which the bed of hops is substantially completely spent of bittering substances.

4. A method according to claim 3, wherein sludge, formed by boiling the wort, is substantially completely filtered off from the wort before it comes into contact with unspent hops.

5. A method of hopping wort which comprises forming a moving bed of hops, feeding hot wort into said moving bed of hops at a first position, allowing said wort to percolate through said moving bed of hops so as to extract bittering substances from the hops and to simultaneously deposit solid materials on said bed, collecting said percolated wort, boiling said percolated wort, refeeding it onto said moving bed of hops at a second position different from said first feeding position and collecting the repercolated wort.

6. A method as claimed in claim 5 in which said second position precedes the first position with respect to the direction of movement of said bed of hops.

7. A method according to claim 1, further comprising collecting the hot wort after percolation through said moving bed of hops, boiling a body of the collected wort at a position below the level of said moving bed of hops, lifting boiling wort from near the bottom of said body of wort by means of the steam generated therein to a position above the level of said moving bed of hops and applying wort to said moving bed of hops from said raised position.

8. A method of hopping wort which comprises forming a moving bed of hops, feeding hot wort into said moving bed of hops at a first position, allowing said wort to percolate throug said moving bed of hops so as to extract bittering substances from the hops and to simultaneously deposit solid materials on said bed, collecting said percolated wort, refeeding it onto said moving bed of hops at a second position different from said first feeding position and collecting the repercolated wort.

References Cited in the file of this patent

UNITED STATES PATENTS

| | | |
|---|---|---|
| 581,354 | Lapp | Apr. 27, 1897 |
| 2,122,761 | Silhavy | July 5, 1938 |
| 2,322,749 | Silhavy | June 29, 1943 |
| 2,354,093 | Stein | July 18, 1944 |
| 2,359,876 | Schwaiger | Oct. 10, 1944 |
| 2,782,104 | Glinka | Feb. 19, 1957 |